United States Patent [19]
Kokot et al.

[11] Patent Number: 5,784,954
[45] Date of Patent: Jul. 28, 1998

[54] JUICE EXTRACTOR

[75] Inventors: Eugeniusz Kokot; Zenon Swaczyj; Marek Piłat; Andrzej Czerpak, all of Poniatowa, Poland

[73] Assignee: Zaklad Produkcji Rynkowej Sp. z o.o., Poniatowa, Poland

[21] Appl. No.: 657,113

[22] Filed: Jun. 3, 1996

Related U.S. Application Data

[63] Continuation-in-part of PCT/PL94/00023, Nov. 28, 1994.

[51] Int. Cl.⁶ ........................................ A47J 19/02
[52] U.S. Cl. ........................ 99/511; 241/37.5; 241/92
[58] Field of Search ................ 99/510, 511, 513, 99/495; 241/37.5, 92, 199.12, 282.1, 282.2

[56] References Cited

U.S. PATENT DOCUMENTS

| | | | |
|---|---|---|---|
| 3,924,838 | 12/1975 | Waniishi et al. | 99/511 X |
| 4,078,481 | 3/1978 | Wunderlin | 99/511 |
| 5,355,784 | 10/1994 | Franklin et al. | 99/511 X |

FOREIGN PATENT DOCUMENTS

| | | |
|---|---|---|
| 0226696 | 7/1987 | European Pat. Off. . |
| 0411603 | 2/1991 | European Pat. Off. . |
| 1265646 | 5/1961 | France .............. 99/511 |
| 1127044 | 4/1962 | Germany . |
| 3639804 | 5/1988 | Germany . |
| 64 677 | 3/1972 | Poland . |
| 87768 | 3/1997 | Poland . |

*Primary Examiner*—Reginald L. Alexander
*Attorney, Agent, or Firm*—Horst M. Kasper

[57] ABSTRACT

The juice extractor is installed on the uniform base (1) on the circular section with the rectangular protrusion. On the circular section the housing (2) is mounted containing the motor (3) with the coupling (4) above which the basin (5), equipped with the antivortex element (7), is mounted. The flexible elements (8), adjacent with their perimeters to the side surfaces of the basket (6) and the coupling (4), are fixed between the basket (6) with the cutter disk and the coupling (4). On the cylindrical part (10) of the cover (9) the adjustable chute cone (11) is mounted. The discharge container (13) rests on the rectangular protrusion of the base (1), and, being adjacent to the housing (2), creates with it a solid having an oval intersection with bevel from the top of it.

21 Claims, 7 Drawing Sheets

JUICE EXTRACTOR

CROSS-REFERENCE TO RELATED APPLICATIONS

This application is a continuation-in-part application of another international application filed under the Patent Cooperation Treaty on Nov. 28, 1994, bearing Application No. PCT/PL94/00023, and listing the United States as a designated and/or elected country. The entire disclosure of this latter application, including the drawings thereof, is hereby incorporated in this application as if fully set forth herein.

BACKGROUND OF THE INVENTION

1. Field of the Invention

The present invention relates to a juice extractor including its own electric drive and constructed for home use, wherein the centrifugal forces, generated as a result of a rotation and a whirl of a basket equipped with a cutter disk for cutting fruits or vegetables, are used to separate the juice from the pulp on the separating sieves and remove automatically the pulp to a special collecting container.

2. Brief Description of the Background of the Invention Including Prior Art

Juice extractors are known from the Polish Patent description No 87 768, wherein a rotating basket, equipped with a cutter disk and perforated walls, is flexibly mounted on the drive motor shaft inside the collecting container. The products to be processed are introduced into the juice extractor through a charging hole located in a cover at the top of the device.

There is also known from the European Patent description No 0 226 696 an improved juice extractor for industrial applications. According to the construction of European Patent description No 0 226 696, the basket with a sieve and the cutter disk are placed inside the container set above the cylindrical housing encircling the electric motor. The cover of the juice extractor with the inlet for introducing the product to be juiced is mounted by means of a specially formed handle coupled to a micro-switch acting as a limit switch, and enabling switching on the motor of the juice extractor only when the device is properly mounted and the handle is in vertical position. The juice extractor is suitably integrated for this purpose. The industrial nature of application of the juice extractor according to European Patent description No 0 226 696 has imposed use of special, massive base of the housing, having a big outer diameter, larger than the diameter of the housing and additionally equipped, in its lower part, with concentric rims with flexible antislip elements. Moreover, the base should include inlet holes for admission of the air into the housing, which, at the top of it, is closed with specially formed cover having suitably larger external diameter so to create, together with the housing, the outlet slot for the air.

A juice extractor is taught in the German printed patent document DE 3639804 A1 to Rebordosa et al. The reference teaches a rotating, cone-shape centrifuge sieve and a juice chamber at least in part surrounding the sieve. The centrifuged juice can rise on the outer wall of the juice chamber 12.

The German printed patent document 1,127,044 laid out Apr. 5, 1962 teaches a juice centrifuge. The juice is to enter a juice chamber connected to a discharge path for the juice. A special stop provision and manual actuation is provided for removal of the husks.

A centrifuge is taught in European Patent application with publication number 0411 603 A2. A chamber is provided for the juice. However, during centrifugal action the juice may climb the outer walls of the chamber based on the momentum imparted to the juice by the rotating basket.

These and other objects and advantages of the present invention will become evident from the description which follows.

BRIEF DESCRIPTION OF THE INVENTION

According to a preferred embodiment of this invention, the juice extractor is installed on a uniform base. The base has a circular cross-section when considered in a horizontal plane together with a rectangular protrusion. The outer corners of the rectangular protrusion are rounded. The housing of the juice extractor is mounted on the circular section. The housing is preferably made of stainless steel. The motor is disposed in the housing and a coupling is mounted on top of the motor. A juice basin is preferably made of stainless steel and is positioned above the motor and the coupling. An antivortex baffle is placed inside the juice basin. The antivortex baffle contains two ribs below a discharge section of the antivortex baffle and on the cylindrical outer surface of the antivortex baffle for allowing to set the antivortex baffle inside the juice basin in a fixed position opposite to marking gauges on the juice basin and the cone of the antivortex baffle. At least three flexible elements having the shape of truncated cone are disposed equally spaced on the perimeter of the coupling and the flexible elements are touching tangentially the side surfaces of the basket and the coupling with the perimeters of the flexible elements. A cover is mounted on top of the juice basin. An adjustable chute cone is disposed on top of the cover and is mating a cylindrical part of the cover, wherein the cylindrical part has a larger chute hole and a smaller chute hole of different shape, wherein the adjustable chute cone is furnished with a discharge hole having a size corresponding to the larger chute hole, and wherein the chute cone matches the cover such that the discharge hole matches the position of either the larger chute hole or of the smaller chute hole.

The chute cone has one, kidney shaped hole made eccentrically to the axis and in particular in a region outside of the axis, and a cylindrical part setting the chute cone on the cylindrical part of the cover. A discharge container collecting the centrifuged portion of the products and the husks juiced rests on the rectangular protrusion of the base. The discharge container is disposed adjacent to a generatrix of the cylinder of the juice extractor housing and creates, together with the cylindrical housing, a solid structure having an oval intersection with the bevel at the top of the solid structure and on the side opposite to the housing. Setting the position of the adjustable chute cone on the cylindrical part of the cover can be made by two cutouts of protrusions of the cylindrical part of the cone and two external ribs or pits on the cylindrical part of the cover, spaced every 180 degrees.

The juice basin is provided, in its lower part and on the side opposite to the discharge container, with the outlet for the juice, having the form of an inverted prism narrowing downwardly and towards an outlet opening, said inverted prism having a rectangular cross-section, with the outlet opening disposed at the vertex of the inverted prism. There is an overload-thermal switch mounted in the base. The flexible elements are fixed inside the basket below the cutter disk of the basket in its cylindrical part or in the cylindrical, outer surface of the coupling. The upper part of the juice basin is equipped with the antivortex baffle having the shape of a cylinder or truncated cone, lowered into the space of the basin. The antivortex baffle is provided with ribs placed on its inner surface for impeding an uninhibited rotary motion of juice on the antivortex baffle. The lower part of the antivortex baffle is below the plane of the frontal disk of the basket and above the bottom of the juice basin, thereby creating a slot between the antivortex baffle and the juice basin, where the juice can drip from the antivortex baffle into the juice basin.

A considerable improvement of the way of fastening the basket on the coupling of the drive shaft of the motor is one of benefits of the preferred embodiment of the invention. Easier connecting and disconnecting of these components have been achieved and the play has been reduced which considerably decreases noise level of this, usually loud sub-assembly. The application on the bottom of the juice extractor of the special type overload-thermal switch without auto-closing contacts creates for a user the safety protection which prevents the product from being switched on again until the results of the a previous switch action have been eliminated and the switch lever is pressed again by the user.

A special shape of the outlet end for the juice has been introduced which special shape ensures juice flowing into a dish without splashing in addition to the features recited above and representing a further feature of this invention. Useful features of this embodiment of the invention result from the adjustability of the relative position of the chute cone relative to the cover such that in one position the hole of the chute cone mates with a smaller, cylindrical hole in the cylindrical part of the cover, which smaller cylindrical hole makes processing berry fruits more efficient.

After setting the cone in a second position, the cone mates with a larger, kidney shaped hole in the cylindrical part of the cover, where the dimensions of the hole of the cover are substantially the same like those of the hole of the chute cone, and this configuration enables juicing of other products, like carrots or apples, in a more efficient way.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

Figure 1:
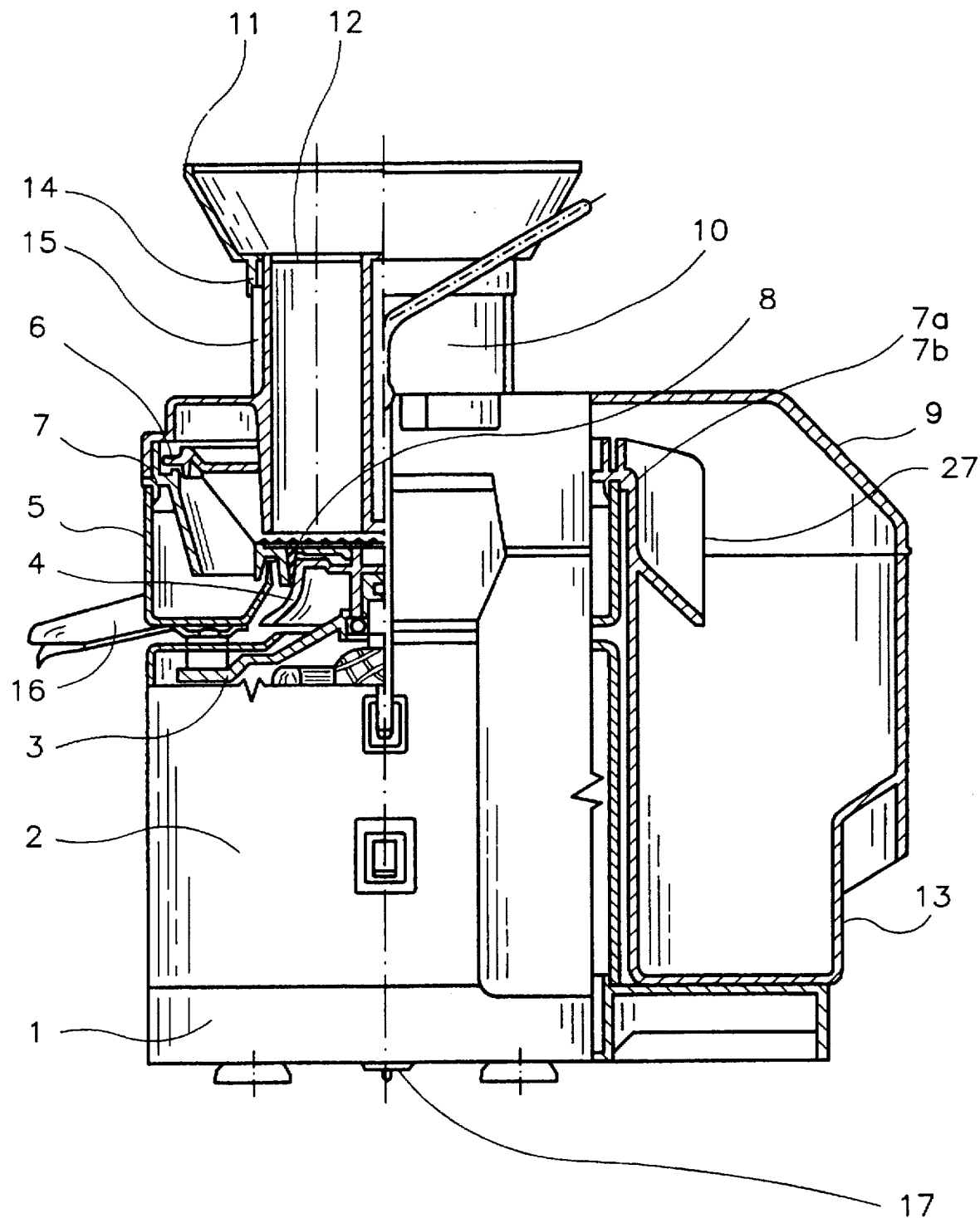
FIG. 1 is an. elevational side view partially in section of the juice extractor.
Figure 2:
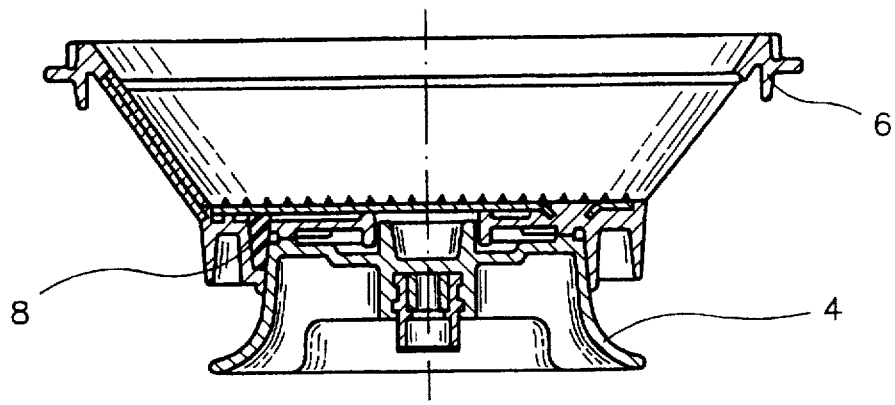
FIG. 2 is a sectional view at an enlarged scale of a rotating basket and a rotating coupling of the juice extractor of FIG. 1.

The novel features which are considered as characteristic for the invention are set forth in the appended claims. The invention itself, however, both as to its method of operation, its products and physical requirements, together with additional objects and advantages thereof, will be best understood from the following description of specific embodiments and examples.

DESCRIPTION OF INVENTION AND PREFERRED EMBODIMENT

In accordance with the present invention, a juice extractor is installed on an uniform base 1, having a circular cross-section with a rectangular protrusion. The outer corners of the rectangular protrusion are rounded. The housing 2 of the juice extractor is preferably made of stainless steel and is disposed on the circular section of the uniform base. An overload-thermal switch 17 of the juice extractor motor 3 is mounted in the base 1. The overload-thermal switch 17 is connected to the wiring of the motor 3 for removing electrical power in case of an excessive thermal condition. A handle 68 (FIG. is attached to the casing 2 for transporting of the juice extractor.

A motor 3 is installed above the uniform base 1. The motor 3 has a shaft connected to a mounted coupling 4, wherein the mounted coupling 4 is preferably made of stainless steel and is disposed inside the juice basin 5. The coupling 4 serves to transmit rotary power from the motor 3 to the basket 6.

The juice basin 5 is formed as an annular trough, wherein the inner wall 35 of the juice basin 5 has its edge disposed between two axially directed projections 26, 36 of the basket 6 extending in a downward direction. The outer wall 45 of the juice basket is formed substantially cylindrical and the upper edge of the outer wall 45 is substantially sealingly engaged by and attached to the antivortex element 7.

The juice basin 5 is provided, in its lower part and on the side opposite to the discharge container 13, with the outlet 16 for the juice, having the form of a prism narrowing downwardly and towards the outlet, rectangular in its cross-section, with the opening at the vertex of the prism, placed from the bottom of it.

The upper part of the juice basin 5 is equipped with an antivortex element 7, having the shape of a cylinder or of a truncated inverted cone, protruding downwardly and lowered into the space of the basin 5. The antivortex element 7 furnishes a baffle to deflect juice being centrifugally thrown by the rotating basket 6. The angle of the inverted truncated cone of the antivortex element 7 relative to a vertical line can be from about 10 to 30 degrees. The antivortex element 7 is attached to the outer periphery of the juice basin 5. Two position lock ribs 7a, 7b are made in the antivortex element 7 below the discharge section 27 of the antivortex element 7 and on the cylindrical surface of the antivortex element 7. The position lock ribs 7a, 7b are associated with the object to set the antivortex element 7 within the juice basin 5 in the position opposite to a marking gauge on the basin 5 and on antivortex the element 7 for engaging the position lock ribs 7a, 7b with corresponding recesses of the juice basin 5. The antivortex element 7 is provided with the juice deflecting ribs 18 placed on its internal surface at the side facing the active area of the basket 6. The juice deflecting ribs 18 preferably are disposed elongated parallel to the rotation axis and the inner edge of the juice deflecting ribs 18 extends preferably in a vertical direction. The length of the juice deflecting ribs 18 preferably reaches to the bottom edge of the antivortex element 7 and the projection height of the juice deflecting ribs 18 at the bottom edge approaches zero. The deflecting ribs 18 can have their upper end at a level substantially the same as the upper edge of the outer wall 45 of the basin 5. The overall shape of a deflecting rib 18 can correspond to a triangle with a right angle, where the hypotenuse coincides with the conical section of the antivortex element 7. There can be from about 6 to 16 deflection ribs 18 attached to the inner wall side of the antivortex element 7. The baffle or antivortex element 7 is disposed in the passage of the juice centrifuged in the basket 6 to the outer wall of the juice basin 5 and prevents that the juice moves on the outer wall of the juice basin 5 in an upward direction and possibly escapes from the juice basin 5.

Figure 3:
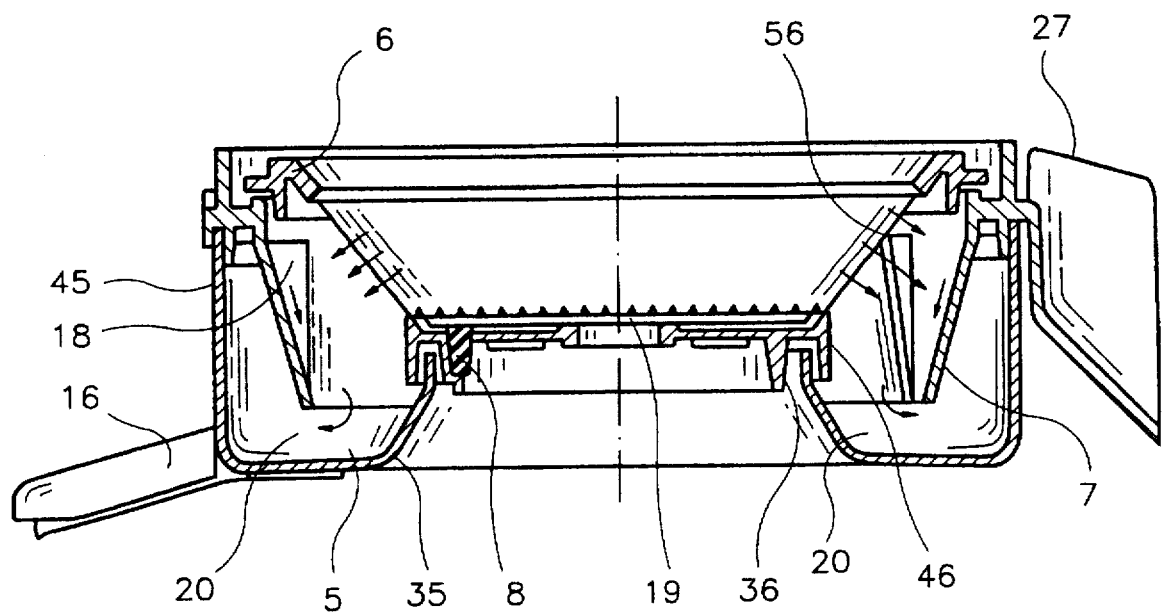
FIG. 3 is a sectional view at an enlarged scale of the rotating basket, a stationary upper cylinder, and a stationary juice basin of the juice extractor of FIG. 1.

The lower part of the antivortex element 7 is below the plane of the cutter disk 19 (FIG. 3) of the basket 6 and above the bottom of the juice basin 5, creating a slot between the antivortex element 7 and the juice basin 5. The slot width in a vertical direction can be from about 0.2 to 0.5 times the vertical extension of the deflecting section of the antivortex element 7. It is a purpose of the antivortex element to prevent juice from forming vortexes on the inner face of the outer wall of the juice basin and thereby preventing a reaching and overflowing of the upper edge of the outer wall 45 of the juice basin 5 by the juice. A peripheral discharge section 27 is attached to the antivortex element 7.

At least three, equally spaced on the perimeter, flexible elements 8 having the shape of truncated cone, are touching, with their perimeters, tangentially to the side surfaces of the basket 6 and the coupling 4. The flexible elements 8 are fixed inside the basket 6 below the cutter disk of the basket 6 in its cylindrical part or in the cylindrical, outer surface of the coupling 4. The flexible elements 8 furnish a resilient connection between the basket 6 and the coupling 4.

The basket 6 is disposed completely inside of an area spanned by the edges of the antivortex element 7. The bottom of the basket includes a horizontally extending cutter 19 for cutting fruits placed on the basket 6 by falling down from the cover and engaged by the rotating cutter 19. Preferably, the perforated wall section 56 of the basket 6 is formed shaped like an inverted frusto-conical surface such that the basket 6 operates like a sieve basket. An imaginary outer extension of the surface of the perforated wall section 56 would intersect along a circular line with the imaginary cylinder generated by extending the outer wall 45 of the juice basin 5 in an upward direction. The angle of the deflection surface of the antivortex element 7 and the position of the antivortex element in a vertical direction are preferably adjusted substantially such that the circular intersection line of the deflection surface of the antivortex element 7 and of the imaginary cylinder generated by extending the outer wall 45 of the juice basin 5 in an upward direction coincides substantially with a circular intersection line defined by the imaginary outer extension of the surface of the perforated wall section 56 and the imaginary cylinder generated by extending the outer wall 45 of the juice basin 5 in an upward direction. The intersection angle between the deflection surface of the antivortex element 7 and an extension of the surface of the perforated wall section 56 can be from about one to two times the intersection angle between the deflection surface of the antivortex element 7 and of the imaginary cylinder generated by extending the outer wall 45 of the juice basin 5 in an upward direction. The intersection angle between the deflection surface of the antivortex element 7 and an extension of the surface of the perforated wall section 56 can be from about 10 to 20 degrees and preferably from about 12 to 15 degrees. The intersection angle between the deflection surface of the antivortex element 7 and an imaginary extension of the surface of the perforated wall section 56 can be between 15 and 30 degrees. The radial extension of the deflecting wall of the antivortex element 7 corresponds substantially to the distance between the upper end of the deflecting wall of the antivortex element 7 and the outer wall 45 of the juice basin 5. The slope of the inner wall of the fruit basin can be an inverse value of the angle between the deflection surface of the antivortex element 7 and of the imaginary cylinder generated by extending the outer wall 45 of the juice basin 5 in an upward direction and of the angle between the imaginary outer extension of the surface of the perforated wall section 56 and the imaginary cylinder generated by extending the outer wall 45 of the juice basin 5 in an upward direction. The length of the frusto-cone wall of the antivortex element 7 can be substantially equivalent to the length of the frusto-cone perforated wall section 56.

A cover 10 is furnished to provide an upper closure above the sieve basket 6 and the antivortex element 7.

An adjustable cone chute 11, having one kidney shaped and eccentrically to the axis made hole 12. The cone or cone chute 11 is set on the cylindrical part 10 of the cover 9 and is mating with the cylindrical part 10 of the cover 9 with two chute holes of different shape, wherein a first chute hole 23 has a circular cross-section and wherein a second chute hole 25 has a kidney shaped or bean shaped cross-section of from about two to three times the cross-sectional area of the first chute hole 23. The holes are all located outside of the respective cylinder axis such that upon rotation the hole of the cone chute can be brought into a matching position relative to one of the holes of the cylindrical part 10.

Figure 4:
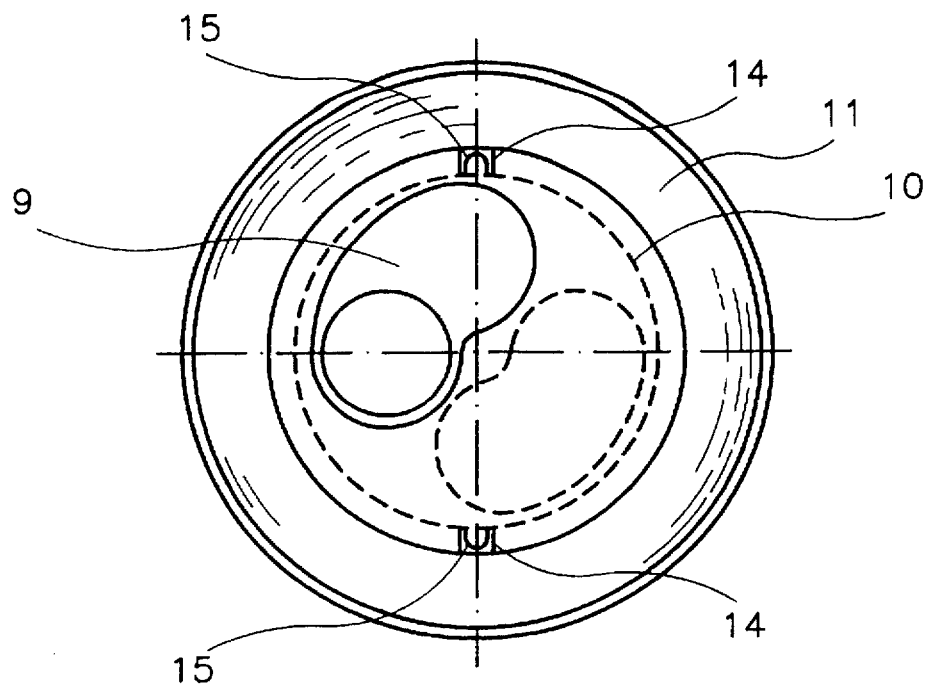
FIG. 4 is a view of a schematic diagram from the top indicating a first position of a chute cone relative to a cover of the juice extractor of FIG. 1.
Figure 5:
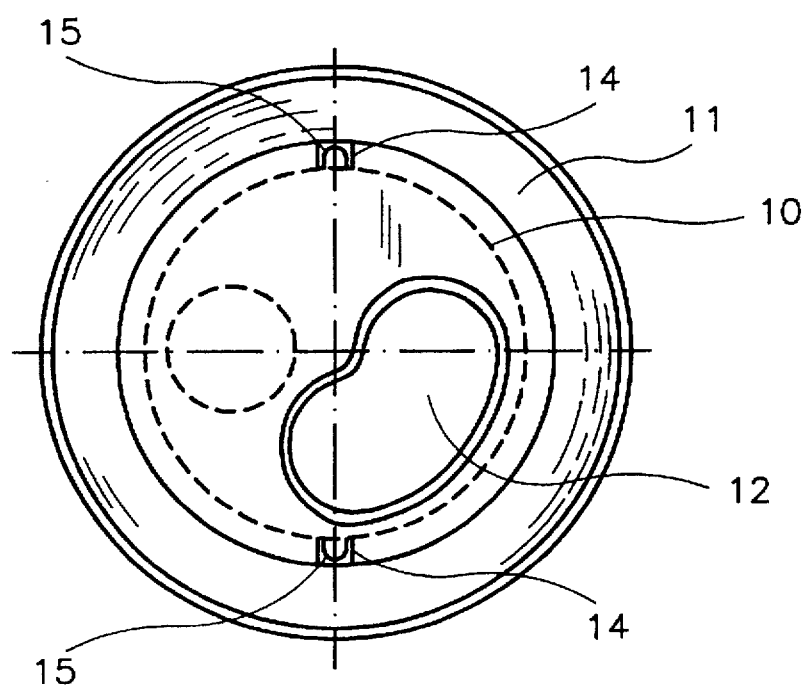
FIG. 5 is a view of a schematic diagram from the top indicating a second position of the chute cone relative to the cover of the juice extractor of FIG. 1.
Figure 6:
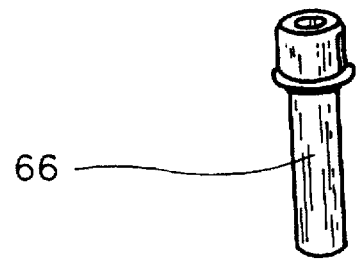
FIG. 6 is a perspective view of a push rod employed in connection with the juice extractor.
Figure 7:
FIG. 7 is a perspective view of the chute cone.
Figure 8:
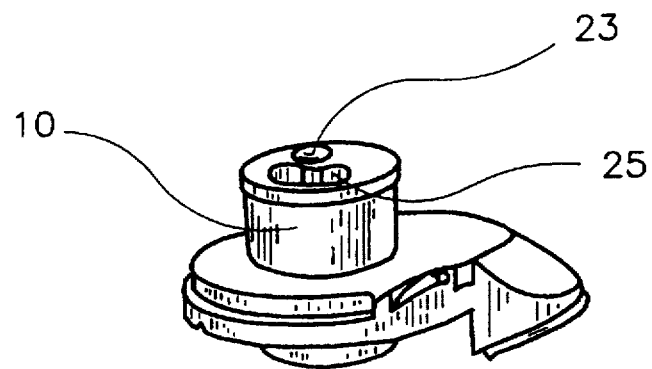
FIG. 8 is a perspective view of the cover.
Figure 9:
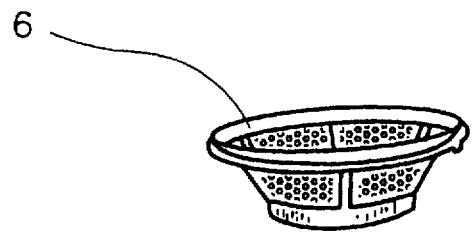
FIG. 9 is a perspective view of a sieve basket of the juice extractor
Figure 10:
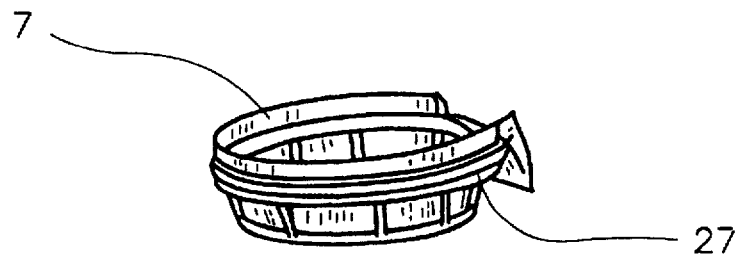
FIG. 10 is a perspective view of the upper cylinder.
Figure 11:
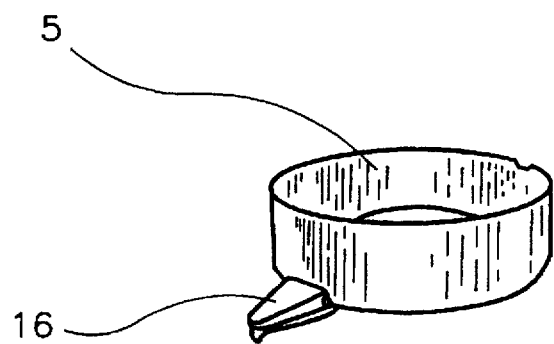
FIG. 11 is a perspective view of the juice basin.
Figure 12:
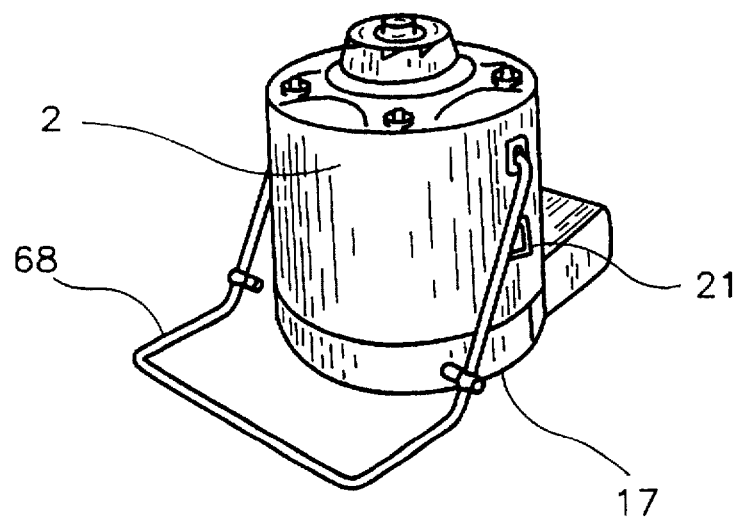
FIG. 12 is a perspective view of a drive of the juice extractor.
Figure 13:
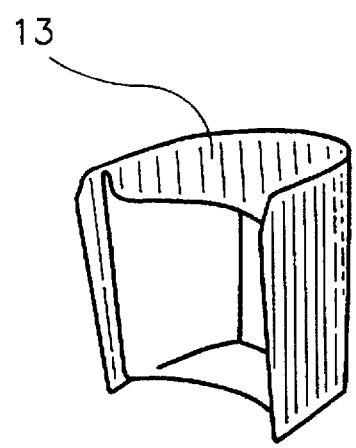
FIG. 13 is a perspective view of the bulk collector of husks.
Figure 14:
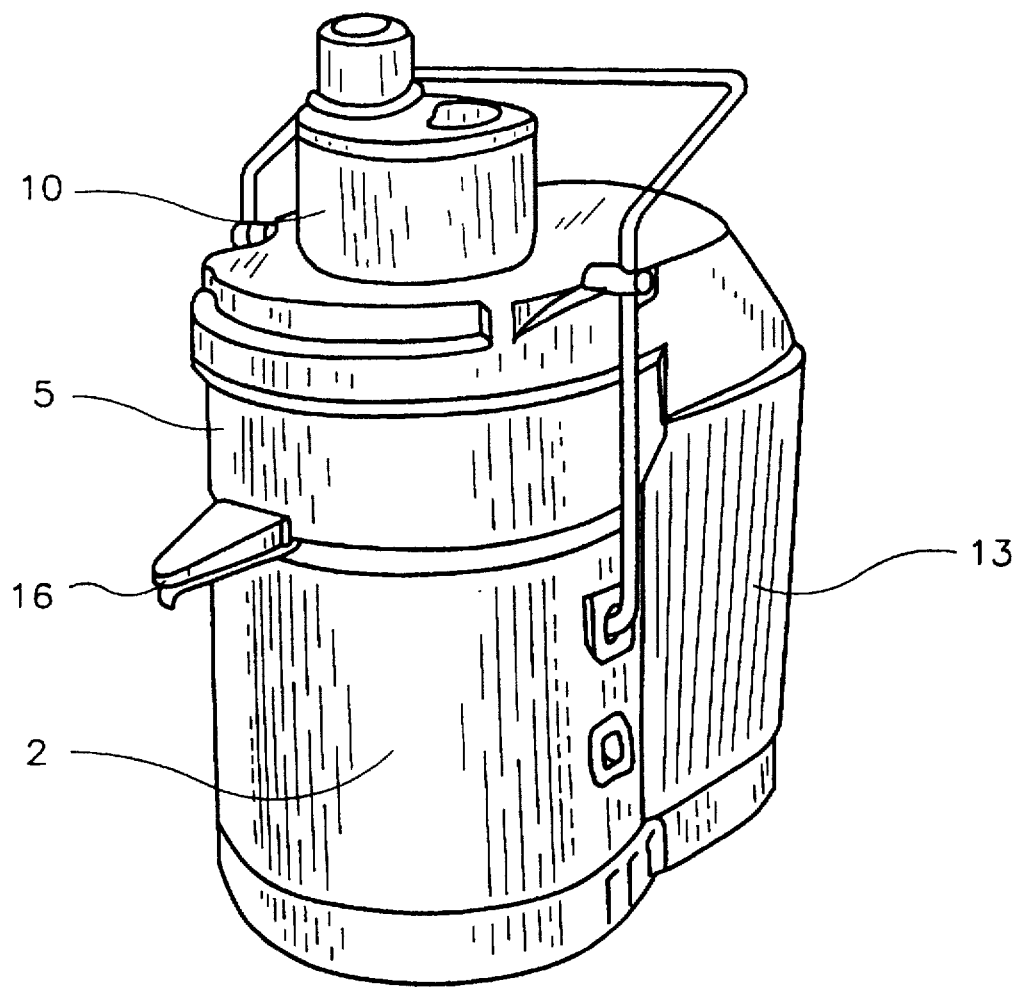
FIG. 14 is a perspective view of the assembled juice extractor.

FIGS. 4 and 5 show schematically the two possible positions of the adjustable chute cone 11 on the cylindrical part 10 of the cover 9. The frusto-conical section of the cone chute 11 can have an angle of from about 20 to 45 degrees relative to a vertical line.

Defining and setting the position of the adjustable chute cone 11 on the cylindrical part 10 of the cover 9 can be made by two cut-outs or protrusions 14 of the cylindrical part of the cone 11 and two external ribs or pits 15 on the cylindrical part 10 of the cover 9, spaced every 180 degrees. A push rod 66 is used to push the material to be processed into and through the kidney shaped hole 12 of the cone chute 11.

The discharge container 13 collecting the centrifuged portion of the products juiced rests on the rectangular protrusion of the base 1 and, being adjacent to the generatrix of the cylinder of the juice extractor housing 2, creates, together with the cylindrical housing 2, the solid having the oval intersection 5 with a level at the top of it and on the side opposite to the housing 2.

It will be understood that each of the elements described above, or two or more together, may also find a useful application in other types of fruit processing apparatus configurations and liquid processing procedures differing from the types described above.

While the invention has been illustrated and described as embodied in the context of a juice extractor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A juice extractor comprising a motor having a shaft for providing rotary energy;

a coupling attached to the shaft of the motor;

a juice basin disposed above the motor for collecting juice and having an inner side of an outer wall;

an antivortex baffle having the shape of a truncated inverted cone, wherein an angle of the inverted truncated, cone of the antivortex baffle relative to a vertical line is from about 10 to 3 degrees, and wherein the antivortex baffle is placed in the juice basin for preventing upward splashing of juice an the inside of the outer wall of the juice basin.

2. The juice extractor according to claim 1 further comprising a basket mounted on top of the coupling and rotating with the coupling and disposed inside of the structure of juice basin and antivortex baffle;

cutting means including a cutter disk mounted in the basket.

3. The juice extractor according to claim 2, wherein a lower part of the antivortex baffle is situated below a plane of the cutter disk of the basket and above the bottom of the juice basin forming a slot.

4. The juice extractor according to claim 1, wherein the outer wall is of cylindrical shape;

wherein a slot is present between the antivortex baffle and the outer wall, wherein a width of the slot in a vertical direction is from about 0.2 to 0.5 times a vertical extension of a deflecting section of the antivortex baffle.

5. The juice extractor according to claim 2, further comprising a perforated wall section of an inverted cone shape disposed above the cutting means, wherein an imaginary outer extension of a surface of the perforated wall section intersects along a circular line with an imaginary cylinder generated by extending the outer wall of the juice basin in an upward direction, wherein an angle of a deflection surface of the antivortex baffle having the shape of a truncated inverted cone and the position of the antivortex baffle having the shape of a truncated inverted cone in a vertical direction are preferably furnished substantially such that a circular intersection line of the deflection surface of the antivortex baffle having the shape of a truncated inverted cone and of the imaginary cylinder, generated by extending the outer wall of the juice basin in an upward direction coincides substantially with a circular intersection line defined by the imaginary outer extension of the surface of the perforated wall section and the imaginary cylinder generated by extending the outer wall of the juice basin in an upward direction.

6. The juice extractor according to claim 5, wherein an intersection angle between the deflection surface of the antivortex baffle having the shape of a truncated inverted cone and the imaginary outer extension of the surface of the perforated wall section is from about one to two times an intersection angle between the deflection surface of the antivortex baffle having the shape of a truncated inverted cone and of the imaginary cylinder generated by extending the outer wall of the juice basin in an upward direction.

7. The juice extractor according to claim 5, wherein an intersection angle between the deflection surface of the antivortex baffle having the shape of a truncated inverted cone and an extension of the imaginary outer surface of the perforated wall section is from about 10 to 20 degrees, and wherein an intersection angle between the deflection surface of the antivortex baffle having the shape of a truncated inverted cone and the imaginary outer extension of the surface of the perforated wall section is between about 15 and 30 degrees.

8. The juice extractor according to claim 1, wherein a radial extension of a deflecting wall of the antivortex baffle is substantially equal to a distance between an upper end of the deflecting wall of the antivortex baffle and the outer wall of the juice basin.

9. A juice extractor comprising a motor having a shaft for providing rotary energy;

a coupling attached to the shaft of the motor;

a juice basin disposed above the motor for collecting juice and having an inner side of an outer wall;

an antivortex baffle placed in the juice basin for preventing upward splashing of the juice on the inner side of the outer wall of the juice basin;

a basket mounted on top of the coupling and rotating with the coupling and disposed in the antivortex baffle for separating the juice;

cutting means including a cutter disk mounted in the basket for cutting fruits, wherein a lower part of the antivortex baffle forming a slot is situated below a plane of the cutter disk and above a bottom of the juice basin; and flexible elements for assembling the cutter disk to the coupling element.

10. The juice extractor according to claim 9 wherein the flexible elements have a shape of a truncated cone.

11. The juice extractor according to claim 9 wherein the flexible elements are fixed in at least one of a cylindrical part of the basket inside the basket below the cutter disk and a cylindrical, outer surface of the coupling.

12. The juice extractor according to claim 9 further comprising a placed on the juice basin and the antivortex baffle and having a rising cylindrical part, wherein a top horizontal surface of the rising cylindrical part is furnished with a first hole disposed outside of an axis of the rising cylindrical part and with a second hole of a different cross-section as compared to a cross-section of the first hole disposed outside of the axis of the rising cylindrical part;

a chute part positioned on the rising cylindrical part and having a hole configured to mate with a larger one of the first hole and the second hole of the cover, wherein the antivortex baffle exhibits a shape of an inverted truncated cone dropped into and positioned in the juice basin.

13. The juice extractor according to claim 12 wherein the antivortex baffle comprises deflection ribs facing the basket and located on an internal surface of the antivortex baffle.

14. The juice extractor according to claim 9 further comprising
a uniform base for installing the motor; an overflow-thermal switch connected to the motor and mounted in the uniform base.

15. The juice extractor according to claim 14 wherein the uniform base has a circular cross-section with a rectangular protrusion.

16. A juice extractor comprising
a juice basin (5);
an antivortex element (7) located in the juice basin (5);
a basket (6) disposed in the antivortex element (7);
cutting means including a cutting disk mounted in the basket (6) and driven by a motor (3) and a coupling element (4) wherein lower part of the antivortex element (7) is situated below a plane of the cutting disk (19) of the basket (6) and above a bottom of the juice basin (5) forming a slot (20); and
flexible elements (8) assembling the coupling element (4) with the cutting disk of the basket (6).

17. The juice extractor according to claim 16, characterized in that flexible elements (8) which assemble the coupling element (4) with the cutting disk have the shape of a truncated cone, and wherein the flexible elements (8) are fixed inside the basket (6) below the cutting disk of the basket (6) in its cylindrical part and in the cylindrical, outer surface of the coupling (4), respectively.

18. The juice extractor according to claim 16, characterized in that the antivortex element (7) has a shape of a truncated inverted cone dropped into the juice basin (5).

19. The juice extractor according to claim 18, characterized in that the antivortex element (7) comprises ribs (18) facing the basket (6) and located on an internal surface of the antivortex element (7).

20. A juice extractor according to claim 16, further comprising
an overflow-thermal switch (17) of the motor (3), mounted in a base of the juice extractor, and wherein the base has a circular cross-section with a rectangular protrusion.

21. A method for extracting juice comprising
placing fruits to be separated into juice and residues into a feed chute;
transporting the fruits from the feed chute to a rotating basket with cutter knifes and having a permeable wall for allowing the juice to escape in a substantially radial direction;
deflecting a part of the juice, escaping from the rotating basket, with an antivortex baffle into a juice basin; collecting the juice in the juice basin;
engaging the feed chute on a rising cylindrical part,
wherein said feed chute has a hole and said cylindrical part having a larger hole and a smaller hole, wherein the hole of the feed chute is configured to mate with the larger hole;
selecting a configuration of the hole to be mating either with the larger hole or the smaller hole such that different throughput diameters are available through the cylindrical part depending on material to be processed.

\* \* \* \* \*